(12) United States Patent
Kodama et al.

(10) Patent No.: US 11,027,971 B2
(45) Date of Patent: Jun. 8, 2021

(54) METHOD FOR PRODUCING HYDROGEN

(71) Applicant: NIIGATA UNIVERSITY, Niigata (JP)

(72) Inventors: Tatsuya Kodama, Niigata (JP);
Nobuyuki Gokon, Niigata (JP)

(73) Assignee: NIIGATA UNIVERSITY, Niigata (JP)

( * ) Notice: Subject to any disclaimer, the term of this patent is extended or adjusted under 35 U.S.C. 154(b) by 0 days.

(21) Appl. No.: 16/045,276

(22) Filed: Jul. 25, 2018

(65) Prior Publication Data
US 2019/0233283 A1 Aug. 1, 2019

(30) Foreign Application Priority Data

Jan. 26, 2018 (JP) .............................. JP2018-012060

(51) Int. Cl.
*C01B 3/06* (2006.01)

(52) U.S. Cl.
CPC .................................... *C01B 3/068* (2013.01)

(58) Field of Classification Search
CPC ....................................................... C01B 3/068
See application file for complete search history.

(56) References Cited

U.S. PATENT DOCUMENTS

| 4,432,960 A | * | 2/1984 | Herrington | .............. | C01B 3/068 423/539 |
| 2009/0107044 A1 | * | 4/2009 | Haile | ........................ | C01B 3/02 48/127.7 |

OTHER PUBLICATIONS

Investigations of reactive cerium-based oxides for H2 production by thermochemical two-step water-splitting. Stephane Abanades et al. J. Mater. Sci. v45, pp. 4163-4173 (Year: 2010).*
Nobuyuki Gokon et al., "Thermochemical reactivity of 5-15 mol% Fe, Co, Ni, Mn-doped cerium oxides in two-step water-splitting cycle for solar hydrogen production," ScienceDirect.com, Sep. 3, 2015, Thermochimica Acta 617 (2015), pp. 179-190.
Nobuyuki Gokon et al., "Oxygen and hydrogen productivities and repeatable reactivity of 30-mol%-Fe-, Co-, Ni-, Mn-doped CeO 2-δ for thermochemical two-step water-splitting cycle," ScienceDirect. com, Jul. 11, 2015, Energy 90 (2015), pp. 1280-1289.

* cited by examiner

*Primary Examiner* — Douglas B Call
(74) *Attorney, Agent, or Firm* — Tucker Ellis LLP; Heather M. Barnes

(57) ABSTRACT

A method for producing hydrogen of the present invention includes thermally reducing a reaction medium in which $CeO_2$ is doped with a metal other than Ce and bringing the thermally reduced reaction medium into contact with water to oxidize the reaction medium and to generate the hydrogen. When a reaction temperature in the thermally reducing the reaction medium is defined as T1 [° C.] and a reaction temperature in the bringing the thermally reduced reaction medium into contact with the water is defined as T2 [° C.], a relation of $T1-T2 \leq 150$ is satisfied. It is preferred that a series of processes including the thermally reducing the reaction medium and the bringing the thermally reduced reaction medium into contact with the water is repeated.

8 Claims, 6 Drawing Sheets

METHOD FOR PRODUCING HYDROGEN

CROSS-REFERENCE TO RELATED APPLICATION

This application claims priority to Japanese Patent Application Serial No. 2018-012060, entitled METHOD FOR PRODUCING HYDROGEN, filed Jan. 26, 2018, which is incorporated herein by reference.

TECHNICAL FIELD

The present invention relates to a method for producing hydrogen.

RELATED ART

As a method for producing hydrogen by thermochemical water-splitting utilizing heat obtained by concentrating solar light, a two-step thermochemical water-splitting cycle by cerium oxide ($CeO_2$, ceria) is promising (for example, Non-patent Documents 1 and 2).

In this two-step thermochemical water-splitting cycle, performed are a step of thermal reduction for abstracting a part of oxygen atoms constituting $CeO_2$ by heating to obtain a nonstoichiometric oxide and a step of reacting the nonstoichiometric oxide with water vapor (water decomposition reaction) to obtain hydrogen.

The step of the thermal reduction is represented by the following formula (1) and the step of the water decomposition reaction is represented by the following formula (2).

  (1)

  (2)

(where, in the formulae (1) and (2), $0<\delta\leq0.5$)

In the two-step thermochemical water-splitting cycle with the cerium oxide ($CeO_2$), from the viewpoint of thermodynamics, the step of the thermal reduction has been performed at a temperature of 1500° C. or more and the step of the water decomposition reaction was performed at a temperature of 1000° C. or less.

However, in the past, energy efficiency has not been sufficiently high, so that improvement of the energy efficiency has been required.

PRIOR ART DOCUMENTS

Non-Patent Documents

Non-patent document 1: N. Gokon, T. Suda, T. Kodama "Thermochemical reactivity of 5-15 mol % Fe, Co, Ni, Mn-doped cerium oxides in two-step water-splitting cycle for solar hydrogen production", Thermochimica Acta, 617 (2015) 179-190.

Non-patent document 2: N. Gokon, T. Suda, T. Kodama "Oxygen and hydrogen productivities and repeatable reactivity of 30-mol %-Fe, Co-, Ni-, Mn-doped $CeO_2$-δ for thermochemical two-step water splitting cycle", Energy, 90 (2015) 1280-1289.

SUMMARY OF THE INVENTION

Problems to be Solved by the Invention

An object of the present invention is to provide a method for producing hydrogen having excellent energy efficiency.

Means for Solving the Problems

Such an object is achieved by the following present inventions.

A method for producing hydrogen of the present invention, comprising:
thermally reducing a reaction medium in which $CeO2$ is doped with a metal other than Ce; and
bringing the thermally reduced reaction medium into contact with water to oxidize the reaction medium and to generate the hydrogen,
when a reaction temperature in the thermally reducing the reaction medium is defined as T1 [° C.] and a reaction temperature in the bringing the thermally reduced reaction medium into contact with the water is defined as T2 [° C.], the following relation is satisfied; $T1-T2\leq150$.

In the method for producing hydrogen of the present invention, it is preferred that a series of processes including the thermally reducing the reaction medium and the bringing the thermally reduced reaction medium into contact with the water is repeated.

In the method for producing hydrogen of the present invention, it is also preferred that the reaction temperature T1 is 1250° C. or more and 1400° C. or less.

In the method for producing hydrogen of the present invention, it is also preferred that the reaction temperature T2 is 1100° C. or more and 1400° C. or less.

In the method for producing hydrogen of the present invention, it is also preferred that the metal constituting the reaction medium is Mn and/or Co,
a substitution ratio of the metal with respect to Ce constituting the CeO2 in the reaction medium is 12 mol % or more and 40 mol % or less.

In the method for producing hydrogen of the present invention, it is also preferred that the thermally reducing the reaction medium and the bringing the thermally reduced reaction medium into contact with the water are performed in a same container.

In the method for producing hydrogen of the present invention, it is also preferred that the thermally reducing the reaction medium and the bringing the thermally reduced reaction medium into contact with the water are performed while circulating a fluidized bed containing the reaction medium in a powder form in a reaction container.

Effects of the Present Invention

According to the present invention, it is possible to provide a method for producing hydrogen having excellent energy efficiency.

BRIEF DESCRIPTIONS OF DRAWINGS

Figure 1:
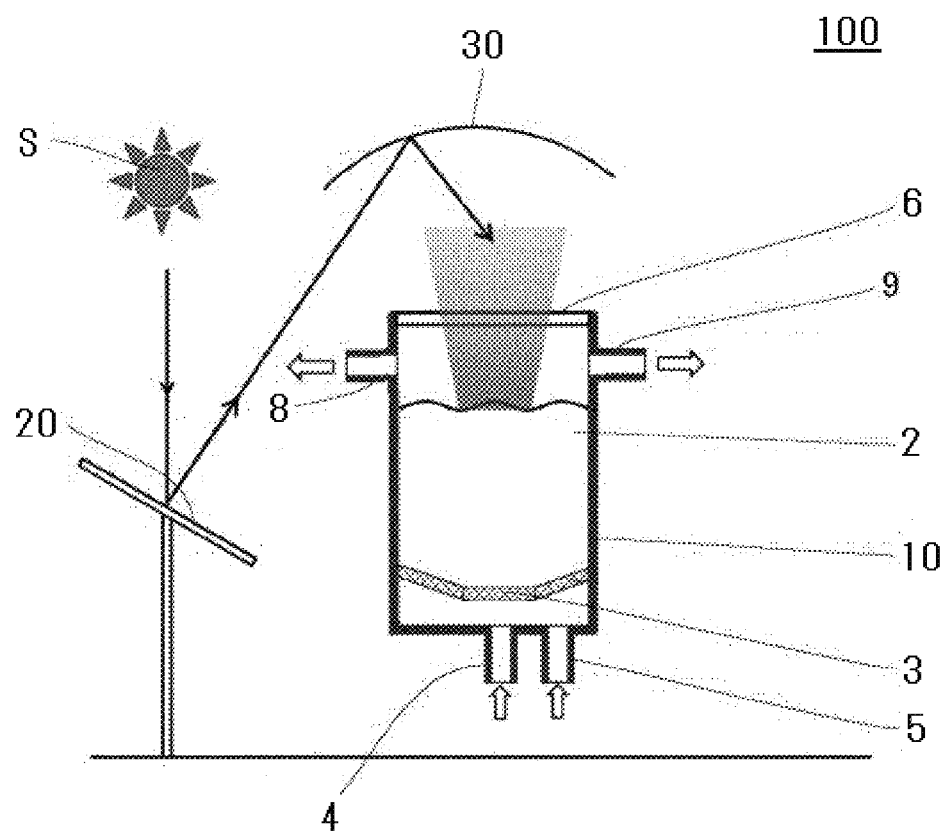
FIG. 1 is a schematic view showing a preferred embodiment of a hydrogen production system.

Hereinafter, description will be made on preferred embodiments of the present invention.

[Method for Producing Hydrogen]

A method for producing hydrogen of the present invention includes: a first step of thermally reducing a reaction medium in which $CeO_2$ (ceria) is doped with a metal other than Ce; and a second step of bringing the thermally reduced reaction medium into contact with water to oxidize the reaction medium and generate the hydrogen. Then, when a reaction temperature in the first step is defined as T1 [° C.] and a reaction temperature in the second step is defined as T2 [° C.], a relationship of T1−T2≤150 is satisfied.

In this way, according to the present invention, a temperature difference between the step (first step) of thermally reducing the reaction medium and the step (second step) of bringing the thermally reduced reaction medium into contact with the water to oxidize the reaction medium by water decomposition and generate the hydrogen is drastically reduced as compared with a conventional method. Thus, it is possible to provide the method for producing hydrogen having the excellent energy efficiency. More specifically, if the temperature difference between the two steps is large, for example, energy loss at the time of performing a temperature cycle in a reactor increases and thus the energy efficiency decreases. However, in the present invention, since the temperature difference between the two steps is made in sufficiently small, such problems do not occur, so that the energy efficiency in producing the hydrogen can be improved.

Further, in the present invention, since the temperature difference between the two steps is small, it is possible to shorten a time required to adjust to a suitable temperature in each step. Therefore, productivity of the hydrogen is improved.

Further, in the present invention, since the temperature difference between the two steps is small, it is possible to suppress a load on a device (reactor) used for producing the hydrogen. As a result, it is possible to stably produce the hydrogen over a long period of time, and it is also possible to obtain effects such as prolongation of a life of the device used for producing the hydrogen and simplification of maintenance.

In addition, since it is not required to have high resistance with respect to impact caused by repeated large temperature changes, a range of selection of constituent materials of the reactor is expanded. Therefore, even with a relatively simple device configuration rather than a special device configuration (for example, a configuration in which two steps are performed in different parts of different reactors, etc.), it is possible to sufficiently improve the energy efficiency at the time of producing the hydrogen and the productivity of the hydrogen, so that it is possible to suppress a manufacturing cost of the hydrogen production system from increasing.

Further, it can also contribute to reducing a running cost of the hydrogen production system.

As described above, the difference (T1−T2) between the reaction temperature in the first step and the reaction temperature in the second step may be 150° C. or less, but it is preferably 0° C. or more and 130° C. or less, more preferably 0° C. or more and 120° C. or less, and even more preferably 0° C. or more and 100° C. or less.

This makes it possible to exhibit the above-mentioned effect more remarkably and improve the productivity of the hydrogen particularly.

In the method for producing hydrogen of the present invention, the heat used for the reaction may be any heat, and not necessarily heat obtained by concentrating solar light. Hereafter, a case where it is the heat obtained by concentrating the solar light will be mainly described.

In the present invention, each of the first step and the second step may be performed at least once, but it is preferable to repeat a series of processes including the first step and the second step.

This makes it possible to increase an amount of water (water vapor) to be treated as a whole, so that it is possible to repeatedly exhibit the effects by reducing the temperature difference between the two steps, while enabling the productivity of the hydrogen to be improved. Therefore, the effects of the present invention as described above can be more remarkably exerted.

In this regard, the present invention may have a pre-treatment step of the first step, an intermediate treatment step between the first step and the second step, and a post-treatment step of the second step. The pre-treatment step and the post-treatment step may be included in the series of processes or may not be included in the series of processes.

Further, in the case where the series of processes are repeatedly performed, the treatment conditions may be changed in at least one step in each cycle.

<First Step> In the first step (thermal reduction step), the reaction medium is thermally reduced.

The reaction medium may be a material that $CeO_2$ (ceria) is doped with the metal other than Ce. Examples of the metal (doping metal) include Mn, Co, Fe, Ni, La, Gd, Hf and the like. One kind or two or more kinds selected from them can be used in combination. In particular, at least one of Mn and Co is preferable.

This makes it possible to improve reaction activity in the first step and the second step, so that it is possible to further improve the energy efficiency in producing the hydrogen and the productivity of the hydrogen.

The reaction in this step can be represented by the following formula (3).

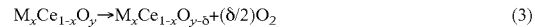

$$M_xCe_{1-x}O_y \rightarrow M_xCe_{1-x}O_{y-\delta} + (\delta/2)O_2 \quad (3)$$

(where in the formula (3), M represents a doping metal, 0<x<1, 1≤y≤2, 0<δ≤y.)

A preferable doping amount of the metal (doping metal) varies depending on a kind of the metal and the like. In the case where the metal is at least one of Mn and Co, a substitution ratio (a value obtained by multiplying x in the above formula (3) by 100) of the metal with respect to Ce constituting $CeO_2$ in the reaction medium is preferably 12 mol % or more and 40 mol % or less.

This makes it possible to further improve the reaction activity in the first step and the second step, so that it is possible to further improve the energy efficiency in producing the hydrogen and the productivity of the hydrogen.

In particular, in the case where the metal (doping metal) is Mn, the substitution ratio of Mn with respect to Ce constituting $CeO_2$ in the reaction medium is preferably 13 mol % or more and 28 mol % or less, and more preferably 14 mol % or more and 25 mol % or less.

As a result, the above-described effects are more remarkably exhibited.

Further, in the case where the metal (doping metal) is Co, the substitution ratio of Co with respect to Ce constituting $CeO_2$ in the reaction medium is preferably 22 mol % or more and 34 mol % or less, and more preferably 26 mol % or more and 33 mol % or less.

As a result, the above-described effects are more remarkably exhibited.

A volume-based average particle diameter of the reaction medium is preferably 10 μm or more and 300 μm or less.

This makes it possible to further improve fluidity of the reaction medium and easiness of handling as well as it is possible to form an appropriate gap between the particles when the reaction medium is stored in a container, so that it is possible to more suitably circulate the gas (a reaction gas, a carrier gas, a product gas) in the first step and the second step.

In this regard, the average particle diameter of the reaction medium can be obtained, for example, by adding a sample to methanol and dispersing it for 3 minutes with an ultrasonic disperse device to obtain a dispersion liquid, and then measuring the dispersion liquid using a Coulter counter method particle size distribution analyzer (TA-II Model manufactured by COULTER ELECTRONICS INS) with an aperture of 50 μm.

At least a part of a surface of the reaction medium may be constituted of the above material (in which $CeO_2$ is doped with the metal other than Ce). For example, the above material (in which $CeO_2$ is doped with the metal other than Ce) may be coated on a surface of a base (carrier) constituted of a material other than the above material (in which $CeO_2$ is doped with the metal other than Ce). In this case, for example, zirconia can be used as the base (carrier).

The reaction temperature (T1) in this step is preferably 1250° C. or more and 1400° C. or less, more preferably 1260° C. or more and 1370° C. or less, and even more preferably 1270° C. or more and 1350° C. or less.

This makes it possible to further improve the energy efficiency of the method for producing hydrogen of the present invention as a whole while sufficiently increasing a reaction rate in this step.

Further, as compared with the conventional two-step thermochemical water-splitting cycle using the solar light, by performing the thermal reduction reaction at a low temperature, even in an area (area where an amount of the solar light is relatively small) other than a sunbelt which was conventionally inappropriate for performing the two-step thermochemical water-splitting cycle, it is possible to reliably produce the hydrogen by the two-step thermochemical water-splitting cycle. That is, it is possible to expand the area where the hydrogen production can be suitably performed, as compared with the conventional cycle.

Further, as compared with the conventional two-step thermochemical water-splitting cycle using the solar light, by performing the thermal reduction reaction at the low temperature, it is possible to shorten a time required to raise the temperature of the reaction medium to a suitable temperature, so that it is possible to further improve the productivity of the hydrogen. In addition, it is possible to suppress the load on the device (reactor) used for producing the hydrogen.

In the case where the processing temperature in this step varies with time, a highest processing temperature in this step can be adopted as T1.

The processing time in this step (in the case of repeating the series of processes, the processing time in one first step) is preferably 20 minutes or more and 180 minutes or less, more preferably 30 minutes or more and 120 minutes or less, and even more preferably 40 minutes or more and 90 minutes or less.

Thereby, it becomes possible to produce the hydrogen in a short time treatment while sufficiently proceeding with the thermal reduction reaction of the reaction medium, so that it is possible to further improve the productivity of the hydrogen.

In this regard, the processing time in this step can be set to a time in which the temperature of the reaction medium is 1100° C. or more in a state that a gas containing the water vapor (a gas having a water vapor partial pressure of 10 kPa or more) is not supplied.

This step is usually performed in an atmosphere with a low partial pressure of oxygen gas.

Specifically, the partial pressure of the oxygen gas in the atmosphere at the time of performing this step is preferably 1 kPa or less, and more preferably 0.1 kPa or less.

This makes it possible to suitably proceed with the reduction reaction of the reaction medium and to effectively prevent the reaction medium which has been reduced once from being involuntarily oxidized again in this step.

This step is generally performed while supplying an inert gas such as argon or a nitrogen gas into the container (reactor) containing the reaction medium.

This makes it possible to efficiently discharge the oxygen generated by the reduction reaction of the reaction medium from a system including the reaction medium, and it is possible to effectively prevent the reaction medium in which the oxygen has been reduced once from being involuntarily oxidized. Further, when the reaction medium is in the form of particles, the reaction medium can be efficiently flowed in the container containing the reaction medium, and the reaction efficiency in this step can be further improved.

In this regard, it is to be noted that this step may be performed under a vacuum environment or under a reduced pressure environment (for example, under an environment of 10 kPa or less).

<Second Step> In the second step (water decomposition step), the reaction medium thermally reduced in the first step is brought into contact with water to oxidize the reaction medium and generate the hydrogen.

The reaction in this step can be represented by the following formula (4).

$$M_xCe_{1-x}O_{y-\delta} + \delta H_2O \rightarrow M_xCe_{1-x}O_y + \delta H_2 \qquad (4)$$

(where in the formula (4), M represents a doping metal, and $0<x<1$, $1 \leq y \leq 2$, $0<\delta \leq y$.)

The reaction temperature (T2) in this step is preferably 1100° C. or more and 1400° C. or less, more preferably 1160° C. or more and 1300° C. or less, and even more preferably 1170° C. or more 1250° C. or less.

This makes it possible to further improve the energy efficiency of the method for producing hydrogen of the present invention as a whole while sufficiently increasing the reaction rate in this step.

In the case where the processing temperature in this step varies with time, a maximum processing temperature in this step can be adopted as T2.

The processing time in this step (in the case of repeating the series of processes, the processing time in one second step) is preferably 10 minutes or more and 150 minutes or less, more preferably 20 minutes or more and 100 minutes or less, and even more preferably 40 minutes or more and 80 minutes or less.

This makes it possible to produce the hydrogen in a short time treatment while sufficiently proceeding with the water decomposition reaction (the hydrogen production and an oxidation reaction of the reaction medium), so that it is possible to further improve the productivity of the hydrogen.

In this regard, the processing time in this step can be set to a time in which the temperature of the reaction medium is 1050° C. or more in a state that a gas containing the water vapor is supplied.

This step is generally performed while supplying the water vapor into the container (reactor) containing the reaction medium.

This makes it possible to react the thermally reduced reaction medium and water more stably and further improve the generation efficiency of the hydrogen. Further, recovery of the generated hydrogen becomes easy. In addition, in the case where the reaction medium is in the form of particles, it is possible to efficiently flow the reaction medium in the container containing the reaction medium and to further improve the reaction efficiency in this step.

The water vapor (steam) partial pressure in the atmosphere at the time of performing this step is preferably 1 kPa or more and 1 MPa or less, and more preferably 10 kPa or more and 100 kPa or less.

This makes it possible to more reliably proceed with the desired reaction, and it is possible to further improve the productivity of the hydrogen.

Further, it is preferred that this step is performed while supplying an inert gas or an inert gas (carrier gas) such as a nitrogen gas in the reaction in this step with the water vapor into the container (reactor) containing the reaction medium.

This makes it possible to further stably proceed with the reaction between the thermally reduced reaction medium and the water, and it is possible to further improve the generation efficiency of the hydrogen. In addition, the recovery of generated hydrogen becomes easier.

In this step, when the water vapor partial pressure in the gas to be supplied into the container (reactor) containing the reaction medium is defined as P1 [Pa] and the partial pressure of the carrier gas is defined as P2 [Pa], the following relation is satisfied: preferably $0.2 \leq P1/P2 \leq 0.999$; and more preferably $0.3 \leq P1/P2 \leq 0.995$.

This makes it possible to more reliably proceed with the desired reaction, and it is possible to further improve the productivity of the hydrogen.

This step is generally performed in an atmosphere with a low partial pressure of oxygen gas.

Specifically, the partial pressure of the oxygen gas in the atmosphere at the time of performing this step is preferably 1 kPa or less, and more preferably 0.1 kPa or less.

This makes it possible to effectively prevent the reaction medium thermally reduced in the first step from being oxidized by the oxidation reaction (oxidation reaction by the oxygen gas) which does not contribute to the generation of the hydrogen, so that it is possible to suitably react the thermally reduced reaction medium and the water.

[Production Device] Hereinafter, description will be made on a hydrogen production system that can be used for the method for producing hydrogen of the present invention.

FIG. 1 is a schematic view showing a preferred embodiment of a hydrogen production system.

The hydrogen production system 100 includes a ground reflection mirror (solar light concentrating means) 20 placed on the ground and referred to as a heliostat, a tower reflection mirror (solar light concentrating means) 30 placed on a tower (not shown), a reactor (container) 10 in which the light reflected by the tower reflection mirror 30 is incident and the reaction of the above-described reaction medium is performed.

In the illustrated hydrogen production system 100, the ground reflection mirror 20 and the tower reflection mirror 30 constitute a beam-down type light concentrating system.

Then, with this beam-down type light concentrating system, the solar light S is concentrated and irradiated on a central portion of an upper surface of a fluidized bed 2 accommodated in the reactor 10.

The reactor 10 is constituted of a heat resistant material that can withstand the temperatures in the first step and the second step described above. Examples of the reactor 10 include one constituted of a stainless alloy and an Inconel alloy.

In the reactor 10, the fluidized bed 2 containing the aforementioned reaction medium is contained.

Further, a gas introduction plate 3 is provided at a bottom of the reactor 10, which can hold particles of the reaction medium constituting the fluidized bed 2 in the reactor 10 and introduce gasses derived from the gas introduction means 4, 5 to the inside of the reactor 10.

A large number of minute openings are provided in the gas introduction plate 3.

The gas introduction means (low oxygen partial pressure gas introduction means) 4 is a flow path (pipeline) for introducing the gas used in the first step into the reactor 10. The gas introduction means (water vapor-containing gas introduction means) 5 is a flow path (pipeline) for introducing the gas used in the second step into the reactor 10.

A window 6 having light permeability and heat resistance is provided on the upper portion of the reactor 10 so that the solar light can pass through. Examples of a constituent material of the window 6 include quartz or the like.

On the side of the upper portion of the reactor 10, there are provided outlets 8, 9 for taking out the gases which have passed through the flow.

More specifically, the reactor 10 is provided with the outlet (oxygen-containing gas outlet port) 8 for taking out the gas (gas containing the oxygen gas generated by the reaction) which has passed through the fluidized bed 2 in the first step, and the outlet (hydrogen-containing gas outlet port) 9 for taking out the gas (gas containing the hydrogen gas generated by the reaction) which has passed through the fluidized bed 2 in the second step.

A shutter (not shown) is provided at each of the outlets 8, 9.

This makes it possible to separate and collect the gas which has passed through the fluidized bed 2 in the first step and the gas which has passed through the fluidized bed 2 in the second step.

More specifically, in the first step, the outlet 8 is opened and the outlet 9 is closed. By doing so, the gas containing the oxygen gas generated by the reaction is recovered from the outlet 8. In the second step, the outlet 8 is closed and the outlet 9 is opened. By doing so, the gas containing the hydrogen gas generated by the reaction is recovered from the outlet 9.

This makes it possible to effectively prevent the gas containing the oxygen gas and the gas containing the hydrogen gas from being mixed involuntarily in the gas to be recovered.

Hereinafter, description will be made on the production of the hydrogen using the hydrogen production system 100.

First, before starting the first step described above, the low oxygen partial pressure gas introduced from the gas introduction means (low oxygen partial pressure gas introduction means) 4 is introduced into the reactor 10 containing the reaction medium through the gas introduction plate 3, and the fluidized bed 2 is flowed to form an internal circulation flow.

Next, while introducing the low oxygen partial pressure gas into the reactor 10, by irradiating the inside of the reaction medium (fluidized bed 2) in the reactor 10 with the solar light S concentrated by the solar light concentrating means 20, 30 through the window 6, the fluidized bed 2 is heated so as to become a desired temperature, so that the reaction in the first step is allowed to proceed.

Next, an amount of solar light S (amount per unit time) to be irradiated into the reactor 10 is lowered and a temperature of a particle reaction medium (fluidized bed 2) is lowered so as to become a desired temperature. In addition, the gas supplied to the inside of the reactor 10 is displaced from the low oxygen partial pressure gas to the water vapor-containing gas. That is, the supply of the gas from the gas introduction means 4 is interrupted and the water vapor-containing gas is supplied from the gas introduction means 5 to the inside of the reactor 10 via the gas introduction plate 3. Thus, it is possible to be allowed the second step to proceed.

Thereafter, the series of processes including the first step and the second step is repeated only a desired number of times.

In the case where the first step is performed again after the second step, the amount of the solar light S (amount per unit time) to be irradiated the reactor 10 is increased and the temperature of the particle reaction medium (fluidized bed 2) is increased so as to become the desired temperature. In addition, the gas supplied to the inside of the reactor 10 is displaced from the water vapor-containing gas to the low oxygen partial pressure gas. That is, the supply of the gas from the gas introduction means 5 is interrupted and the low oxygen partial pressure gas is supplied from the gas introduction means 4 to the inside of the reactor 10 via the gas introduction plate 3.

As described above, by performing the first step and the second step in the same container (in particular, performing at the same part of the same container), it is possible to simplify the configuration of the hydrogen production system. Further, it is possible to suppress the manufacturing cost of the hydrogen production system from increasing and it becomes easy to install the hydrogen production system.

In addition, as described above, it is possible to further improve the productivity of the hydrogen by performing the first step and the second step while circulating the fluidized bed 2 containing the reaction medium in the powder form in the reaction container.

Although the preferred embodiments of the present invention have been described above, the present invention is not limited to these.

For example, the method for producing hydrogen of the present invention is not limited to one that is performed using the hydrogen production system described above and may be performed using a hydrogen production system having another configuration. More specifically, in the embodiments described above, the case where the first step and the second step are performed at the same part of the hydrogen production system (reactor) has been mainly described. However, for example, the first step and the second step may be performed at a different part of the hydrogen production system (reactor).

In the embodiment described above, the case where the reaction medium is in the particulate form (powder form) has been mainly described. However, the reaction medium may have any shape, for example, a molded body or the like constituted from a porous body (for example, a foam). Thus, in the first step and the second step, the reaction medium and the gas can be suitably brought into contact with each other, so that the intended reaction can be allowed to proceed suitably.

Further, in the embodiments described above, the case where the reaction is performed using the heat generated by the solar light has been mainly described. However, in the present invention, heat other than the solar light may be used as at least a part of the heat used for the reaction.

EXAMPLES

Hereinafter, the present invention will be described in detail based on concrete examples, but the present invention is not limited thereto.

In the following description, particularly, the treatment not showing a temperature condition was performed at room temperature (23° C.) and relative humidity of 50%. Also, regarding various kinds of measurement conditions, particularly, those not showing the temperature condition are numerical values at the room temperature (23° C.) and the relative humidity of 50%.

[Production of reaction medium] A reaction medium was produced as follows.

(Preparation Example 1) First, predetermined amounts of $Ce(NO_3)_3.6H_2O$ and $MnSO_4.5H_2O$ were put into water and were stirred at room temperature to obtain an aqueous solution.

Next, while stirring this aqueous solution, an aqueous sodium hydroxide was added by drops to this aqueous solution to adjust the pH to 8.5. Thus, a precipitate was obtained.

Next, the precipitate was collected by centrifugation, washed with purified water and acetone, and dried at room temperature for 24 hours.

Thereafter, a sintering treatment was performed at 900° C. for 2 hours to obtain a reaction medium constituted of Mn-doped $CeO_2$.

In the reaction medium thus obtained, a volume-based average particle size was 200 μm and a substitution ratio of Mn with respect to Ce constituting $CeO_2$ was 15 mol %.

(Preparation Examples 2 to 4) Reaction mediums were prepared in the same manner as in Preparation Example 1, except that the mixing ratio of $Ce(NO_3)_3.6H_2O$ and $MnSO_4.5H_2O$ was changed.

In the reaction mediums thus obtained, substitution ratios of Mn with respect to Ce constituting $CeO_2$ were 5 mol %, 10 mol % and 30 mol %, respectively.

(Preparation Example 5) A reaction medium was prepared in the same manner as in Preparation Example 1, except that $CoSO_4.7H_2O$ was used instead of $MnSO_4.5H_2O$ and the mixing ratio of $Ce(NO_3)_3.6H_2O$ and $CoSO_4.7H_2O$ was adjusted.

The reaction medium thus obtained was constituted of $CeO_2$ doped with Co and a substitution ratio of Co with respect to Ce constituting $CeO_2$ was 5 mol %.

(Preparation Examples 6 to 9) Reaction mediums were prepared in the same manner as in Preparation Example 6, except that the mixing ratio of $Ce(NO_3)_3.6H_2O$ and $CoSO_4.7H_2O$ was changed.

In the reaction mediums thus obtained, substitution ratios of Co with respect to Ce constituting $CeO_2$ were 10 mol %, 15 mol %, 25 mol % and 30 mol %, respectively.

(Preparation Example 10) A reaction medium was prepared in the same manner as in Preparation Example 1, except that $MnSO_4.5H_2O$ was not used.

The reaction medium thus obtained was constituted of CeO$_2$ (not doped with a metal other than Ce).

[Production of Hydrogen] (Example A1) Hydrogen was produced as follows using a thermal balance (TG8120 produced by Rigaku Corporation).

That is, first, using the reaction medium prepared in Preparation Example 1, the hydrogen was produced as follows.

First, 0.1 g of the reaction medium prepared in Preparation Example 1 was prepared and placed in a reactor tube in heating furnace, and then an atmosphere in a reactor tube was replaced with a nitrogen gas.

Next, while flowing the nitrogen gas into the reactor tube, the temperature of the reaction medium in the reactor tube was raised to 1300° C. by heating furnace and held at 1300° C. for 10 minutes. At this time, a pressure inside the reactor tube was adjusted to become 100 kPa. The nitrogen gas used at this time had a purity of 99.9% or more, and a water vapor partial pressure and a partial pressure of oxygen gas in the reactor tube were 0.1 kPa or less, respectively.

Thereafter, the temperature of the reaction medium in the reactor tube was lowered, and when the temperature reached 1200° C., an inflow gas into the reactor tube in the electric furnace was displaced to a mixed gas of the water vapor and the nitrogen gas. At this time, the pressure inside the reactor tube was adjusted to become 100 kPa. At this time, the partial pressure of the nitrogen gas in the reactor tube was 70 kPa, the water vapor partial pressure was 30 kPa, and the partial pressure of the oxygen gas was 0.1 kPa or less.

The heat treatment under the nitrogen gas atmosphere (in particular, the heat treatment at 1100° C. or higher) is the first step of performing the thermal reduction reaction of the reaction medium. The heat treatment under the atmosphere of the mixed gas of the water vapor and the nitrogen gas is the second step of performing the water decomposition reaction.

Figure 2:
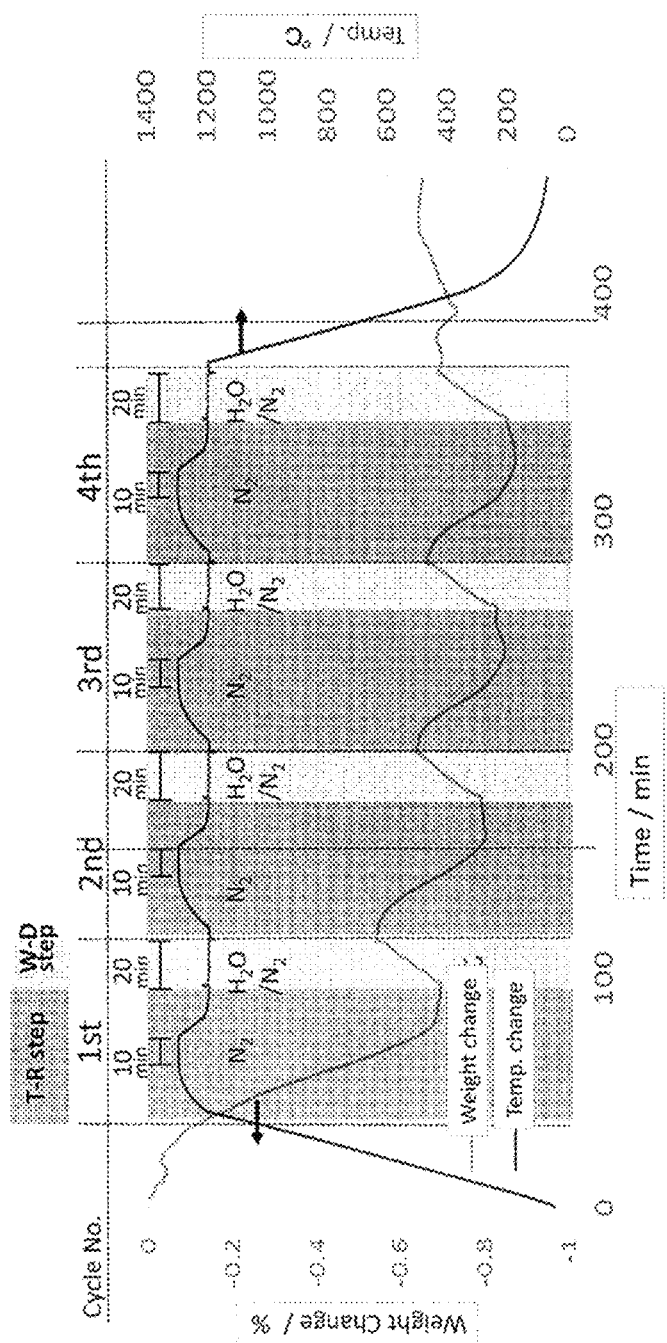
FIG. 2 is graphs showing a relationship between a temperature profile and a mass change of a reaction medium when the method for producing hydrogen of Example A1 is performed.

After the second step was performed at 1200° C. for 20 minutes, the gas flowing into the reactor tube in the electric furnace was displaced to the mixed gas of the water vapor and the nitrogen gas like the above. In addition, the temperature of the reaction medium was raised to 1300° C., and then the same treatment as the above is performed repeatedly to perform the first step and the second step four times in total. In other words, a set of the first step and the second step was repeated 4 cycles. A relationship between a temperature profile at this time and a mass change of the reaction medium is shown in FIG. 2.

(Examples A2 to A4) Hydrogens were produced in the same manner as in Example A1, except that the reaction mediums prepared in Preparation Examples 2 to 4 were used as the reaction medium, respectively.

(Examples A5 to A8) Hydrogens were produced in the same manner as in Examples A1 to A4, except that the processing temperature T1 in the first step was changed to 1350° C.

(Examples B1 to B5) Hydrogens were produced in the same manner as in Example A1, except that the reaction mediums prepared in Preparation Examples 5 to 9 were used as the reaction medium, respectively.

(Examples B6 to B10) Hydrogens were produced in the same manner as in Examples B1 to B5, except that the processing temperature T1 in the first step was changed to 1350° C.

(Comparative Example A1) Hydrogen was produced in the same manner as in Example A1, except that the reaction medium prepared in Preparation Example 10 was used as the reaction medium.

(Comparative Example A2) Hydrogen was produced in the same manner as in Example A1, except that an infrared image furnace (RHL-VHT-E44 and RHL-E45 manufactured by ULVAC Riko Inc.) was used instead of the thermal balance, the processing temperature T1 in the first step was changed to 1500° C., and the processing temperature T2 in the second step was changed to 1150° C.

(Comparative Examples A3 to A5, B1 to B4) Hydrogens were produced in the same manner as in Comparative Example A2, except that a kind of the reaction medium, the processing temperature T1 in the first step, and the processing temperature T2 in the second step were changed as shown in Table 1.

The main production conditions for each of the Examples and each of the Comparative Examples are shown as a whole in Table 1.

TABLE 1

| | Kind of reaction medium | T1 [° C.] | T2 [° C.] | T1 − T2 [° C.] |
|---|---|---|---|---|
| Example A1 | Preparation Example 1 (Mn15 mol %) | 1300 | 1200 | 100 |
| Example A2 | Preparation Example 2 (Mn5 mol %) | 1300 | 1200 | 100 |
| Example A3 | Preparation Example 3 (Mn10 mol %) | 1300 | 1200 | 100 |
| Example A4 | Preparation Example 4 (Mn30 mol %) | 1300 | 1200 | 100 |
| Example A5 | Preparation Example 1 (Mn15 mol %) | 1350 | 1200 | 150 |
| Example A6 | Preparation Example 2 (Mn5 mol %) | 1350 | 1200 | 150 |
| Example A7 | Preparation Example 3 (Mn10 mol %) | 1350 | 1200 | 150 |
| Example A8 | Preparation Example 4 (Mn30 mol %) | 1350 | 1200 | 150 |
| Example B1 | Preparation Example 5 (Co5 mol %) | 1300 | 1200 | 100 |
| Example B2 | Preparation Example 6 (Co10 mol %) | 1300 | 1200 | 100 |
| Example B3 | Preparation Example 7 (Co15 mol %) | 1300 | 1200 | 100 |
| Example B4 | Preparation Example 8 (Co25 mol %) | 1300 | 1200 | 100 |
| Example B5 | Preparation Example 9 (Co30 mol %) | 1300 | 1200 | 100 |
| Example B6 | Preparation Example 5 (Co5 mol %) | 1350 | 1200 | 150 |
| Example B7 | Preparation Example 6 (Co10 mol %) | 1350 | 1200 | 150 |
| Example B8 | Preparation Example 7 (Co15 mol %) | 1350 | 1200 | 150 |
| Example B9 | Preparation Example 8 (Co25 mol %) | 1350 | 1200 | 150 |
| Example B10 | Preparation Example 9 (Co30 mol %) | 1350 | 1200 | 150 |
| Comparative Example A1 | Preparation Example 10 (No doped) | 1300 | 1200 | 100 |
| Comparative Example A2 | Preparation Example 1 (Mn15 mol %) | 1500 | 1150 | 350 |
| Comparative Example A3 | Preparation Example 2 (Mn5 mol %) | 1500 | 1000 | 500 |
| Comparative Example A4 | Preparation Example 3 (Mn10 mol %) | 1500 | 1150 | 350 |
| Comparative Example A5 | Preparation Example 4 (Mn30 mol %) | 1500 | 1150 | 350 |
| Comparative Example B1 | Preparation Example 5 (Co5 mol %) | 1500 | 1060 | 500 |
| Comparative Example B2 | Preparation Example 6 (Co10 mol %) | 1500 | 1150 | 350 |
| Comparative Example B3 | Preparation Example 7 (Co15 mol %) | 1500 | 1150 | 350 |
| Comparative Example B4 | Preparation Example 9 (Co30 mol %) | 1500 | 1150 | 350 |

[Results] Conversion ratios of the reaction mediums in the first step and the second step of each cycle were determined from the mass change of the reaction medium obtained in the production of the hydrogen in each of the above Examples and each of the Comparative Examples.

As a result, in the present invention, the conversion ratios showed high in all of the Examples, so that it was found that the desired reaction proceeded favorably in the first step and the second step. In particular, in the present invention, the conversion ratios after the second cycle in which the conversion of the reaction medium was stable were higher than that in Comparative Example A1. Further, variations in the conversion ratios in each cycle after the second cycle in all Examples were particularly small.

Figure 3:
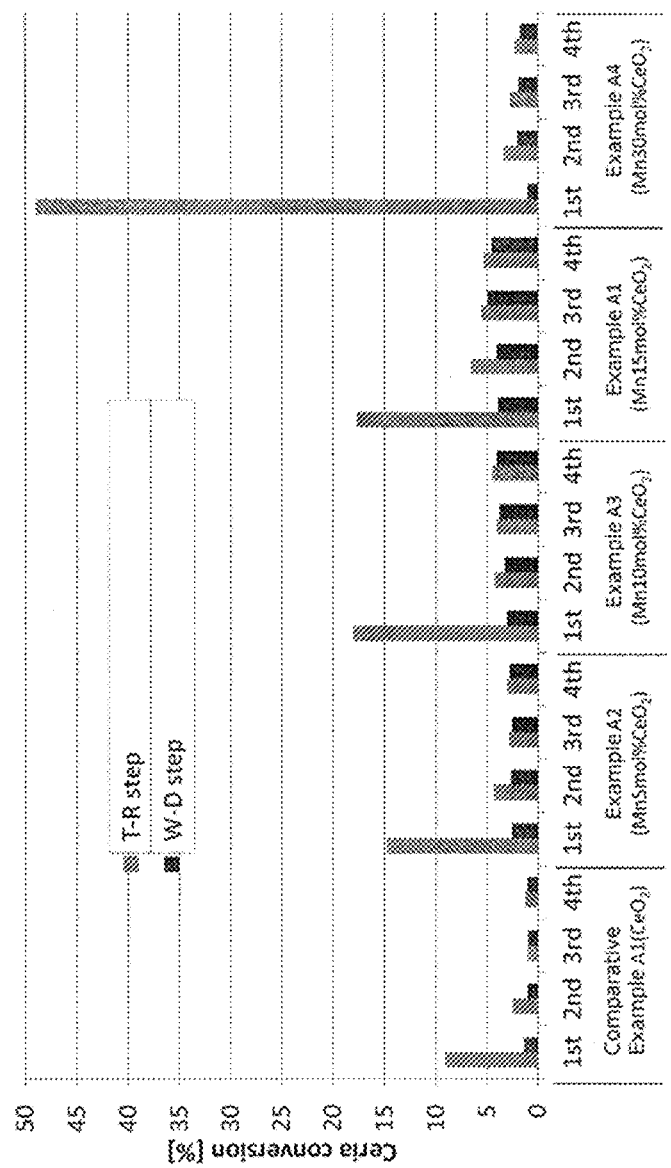
FIG. 3 is graphs showing conversion ratios of reaction mediums in a first step and a second step in a first cycle to a fourth cycle in each of Comparative Example A1 and Examples A1 to A4.
Figure 4:
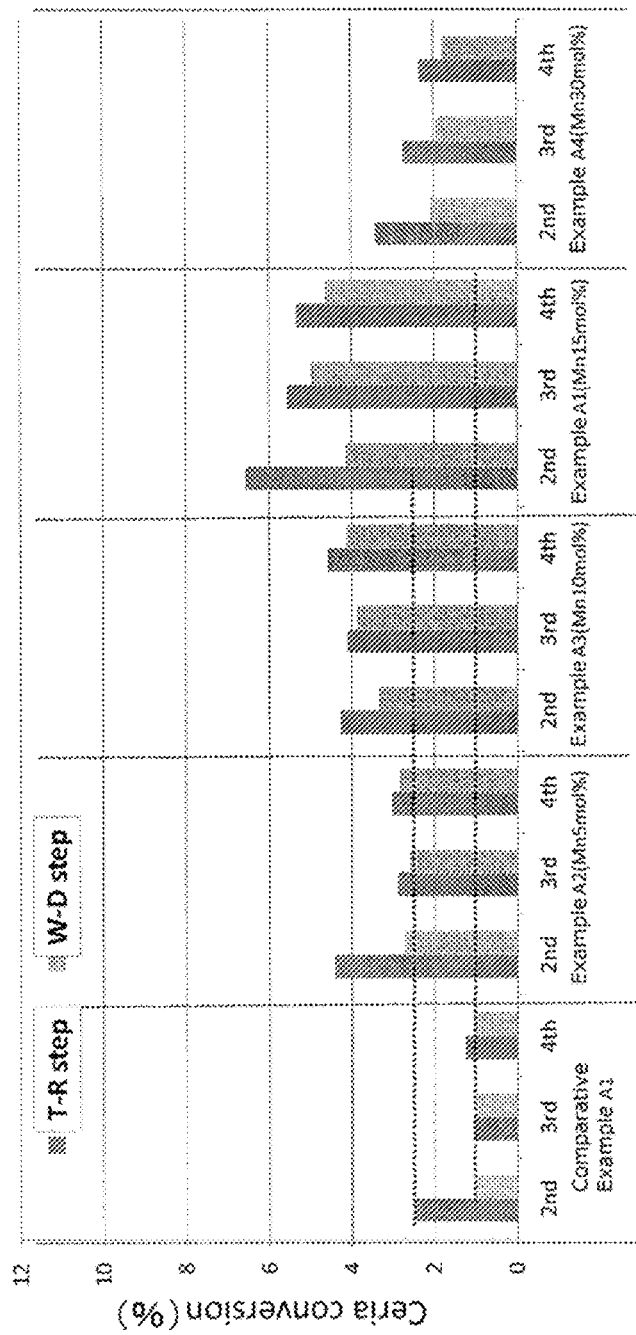
FIG. 4 is graphs showing conversion ratios of reaction mediums in a first step and a second step in a second cycle to a fourth cycle in each of Comparative Example A1 and Examples A1 to A4.
Figure 5:
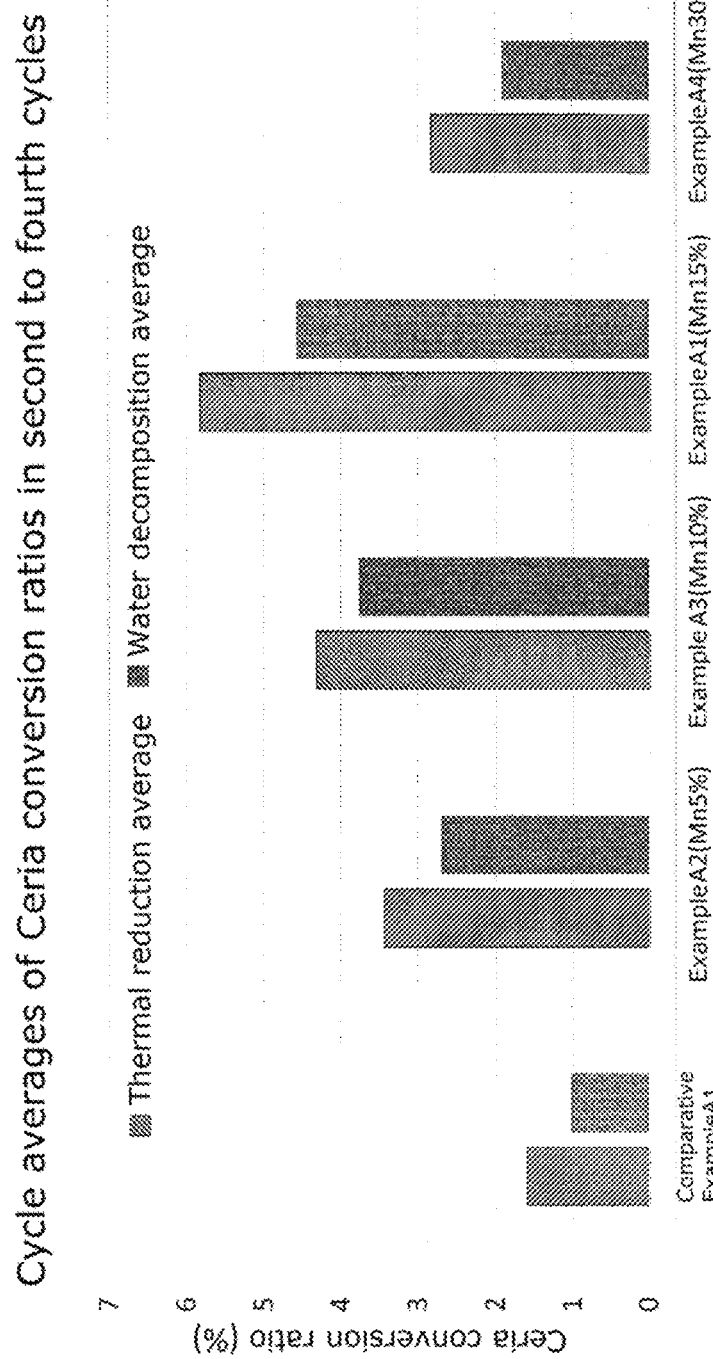
FIG. 5 is graphs showing average values of conversion ratios of reaction mediums in a first step and a second step in a second cycle to a fourth cycle in each of Comparative Example A1 and Examples A1 to A4.
Figure 6:
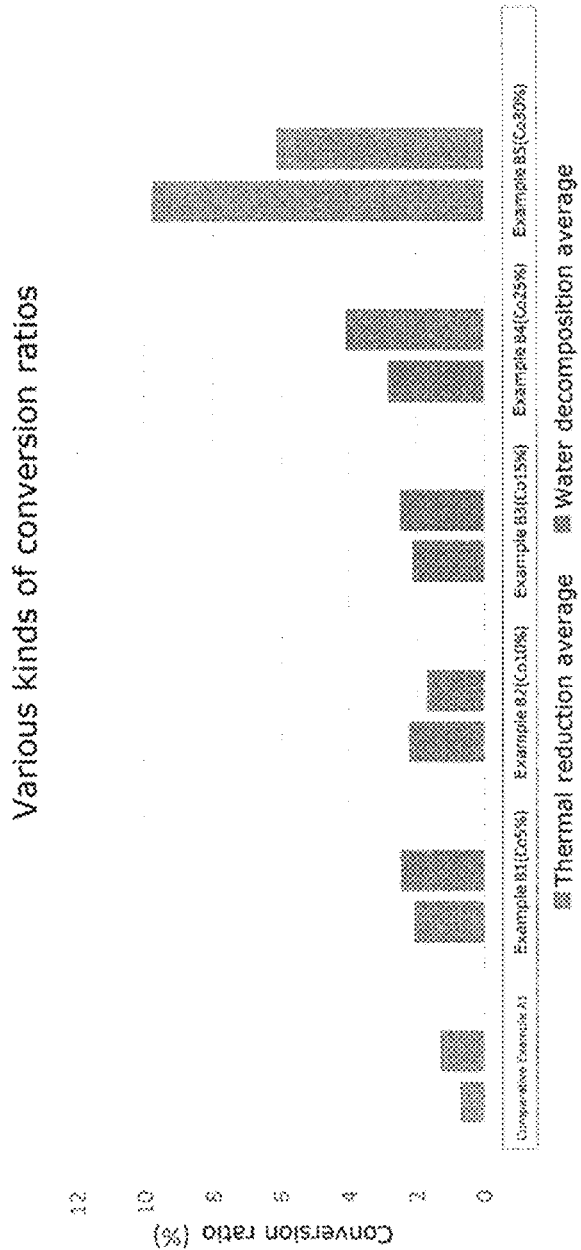
FIG. 6 is graphs showing average values of conversion ratios of reaction mediums in a first step and a second step in a second cycle to a third cycle in Comparative Example A1 and Examples B1 to B5.

FIG. 3 shows graphs showing the conversion ratios of the reaction mediums in the first step and the second step in the first cycle to the fourth cycle in Comparative Example A1 and Examples A1 to A4. FIG. 4 shows graphs showing the conversion ratios of the reaction mediums in the first step and the second step in the second cycle to the fourth cycle in Comparative Example A1 and Examples A1 to A4. FIG. 5 shows graphs showing average values of the conversion ratios of the reaction mediums in the first step and the second step in the second cycle to the fourth cycle in Comparative Example A1 and Examples A1 to A4. FIG. 6 shows graphs showing average values of the conversion ratios of the reaction mediums in the first step and the second step in the second cycle to the third cycle in Comparative Example A1 and Examples B1 to B5.

Further, in the present invention, since the temperature differences between the first step and the second step in all Examples were smaller than those of the comparative examples A2 to A5 and B1 to B4, it was obvious that the energy loss at the time of the temperature cycle in the reactor was small, which indicated that the energy efficiency was excellent.

Further, hydrogen was produced under the same conditions as those described above, except that the device as shown in FIG. 1 was used. As a result, the same results as those described above were obtained.

INDUSTRIAL APPLICABILITY

The method for producing hydrogen of the present invention includes the first step of thermally reducing the reaction medium in which $CeO_2$ is doped with the metal other than Ce and the second step of bringing the thermally reduced reaction medium into contact with the water to oxidize the reaction medium and to generate the hydrogen. When the reaction temperature in the first step is defined as T1 [° C.] and the reaction temperature in the second step is defined as T2 [° C.], a relation of T1−T2≤150 is satisfied. Therefore, it is possible to provide the method for producing hydrogen having the excellent energy efficiency. Therefore, the method for producing hydrogen of the present invention has industrial applicability.

EXPLANATION OF REFERENCE NUMERAL

100 . . . Hydrogen production system
10 . . . Reactor (container)
2 . . . Fluidized bed
3 . . . Gas introduction plate
4 . . . Gas introduction means (low oxygen partial pressure gas introduction means)
5 . . . Gas introduction means (water vapor-containing gas introduction means)
6 . . . Window
8 . . . Outlet (oxygen-containing gas outlet port)
9 . . . Outlet (hydrogen-containing gas outlet port)
20 . . . Ground reflector (solar light concentrating means)
30 . . . Tower reflecting mirror (solar light concentrating means)
S . . . Solar light

What is claimed is:

1. A method for producing hydrogen, comprising: thermally reducing a reaction medium in which $CeO_2$ is doped with a metal other than Ce; and
bringing the thermally reduced reaction medium into contact with a gas containing water vapor and nitrogen gas to oxidize the reaction medium and to generate the hydrogen,
when a reaction temperature in the thermally reducing the reaction medium is defined as T1 [° C.] and a reaction temperature in the bringing the thermally reduced reaction medium into contact with the gas is defined as T2 [° C.], the following relation is satisfied; T1−T2≤150 [° C.],
wherein the reaction temperature T2 is 1160° C. or more and 1300° C. or less,
wherein the metal constituting the reaction medium is Mn and/or Co, and
wherein a series of processes including the thermally reducing the reaction medium and the bringing the thermally reduced reaction medium in to contact with gas is successively repeated in a same reaction container, and
wherein in the bringing the thermally reduced reaction medium into contact with the gas, when a water vapor partial pressure in the gas to be supplied into the reaction container is defined as P1 [Pa] and a partial pressure of the nitrogen gas in the gas to be supplied into the reaction container is defined as P2 [Pa], the following relation is satisfied: 0.2≤P1/P2≤3/7.

2. The method as claimed in claim 1, wherein the reaction temperature T1 is 1250° C. or more and 1400° C. or less.

3. The method as claimed in claim 1, wherein the metal constituting the reaction medium is Mn,
a substitution ratio of Mn with respect to Ce constituting the $CeO_2$ in the reaction medium is 13 mol % or more and 28 mol % or less.

4. The method as claimed in claim 1, wherein the thermally reducing the reaction medium and the bringing the thermally reduced reaction medium into contact with the gas are performed while circulating a fluidized bed containing the reaction medium in a powder form in the reaction container.

5. The method as claimed in claim 1, wherein the thermally reducing the reaction medium is conducted in an atmosphere having an oxygen partial pressure of 1 kPa or less.

6. The method as claimed in claim 1, wherein the metal constituting the reaction medium is Co, a substitution ratio of Co with respect to Ce constituting the $CeO_2$ in the reaction medium is 22 mol % or more and 34 mol % or less.

7. The method as claimed in claim 1, wherein a processing time of the thermally reducing the reaction medium in one cycle of the series of processes is 20 minutes or more and 180 minutes or less.

8. The method as claimed in claim 1, wherein a processing time of the bringing the thermally reduced reaction medium into contact with the gas in one cycle of the series of processes is 10 minutes or more and 150 minutes or less.

* * * * *